HIGH SPEED COMPARATOR
Filed Nov. 5, 1962

INVENTOR.
Alan V. White
BY Melvin Sharp

United States Patent Office 3,246,171

Patented Apr. 12, 1966

3,246,171

HIGH SPEED COMPARATOR

Alan V. White, Houston, Tex., assignor to Texas Instruments Incorporated, Dallas, Tex., a corporation of Delaware Filed Nov. 5, 1962, Ser. No. 235,188
12 Claims. (Cl. 307—88.5)

This is a continuation-in-part application of previously filed application, Serial No. 234,359, filed October 31, 1962 and issued November 24, 1964 as Patent No. 3,158,759.

The invention relates to a system for comparing different signals and more particularly to a system capable of producing an output signal whose polarity is indicative of which of said signals is greater and whose magnitude is proportional to the extent of the difference between said signals.

The invention relates to a system having two modes of operation, balance and compare. In the balance mode, a first signal is sampled and stored so that it may be utilized as a reference signal in the compare mode. In the compare mode, said reference signal is compared to a second signal producing an output whose polarity is indicative of which signal is greater and whose magnitude is proportional to the extent of the difference between said first and second signals. Therefore, a compare amplifier is utilized in the balance mode as a low gain amplifier for passing the first signal for storage purposes. In the compare mode, said amplifier is utilized as a high gain differential amplifier for comparing a second signal with the stored first signal. This is accomplished by providing a differential amplifier having a negative feedback path coupled between its output and one of its inputs, forcing said amplifier to operate as a low gain amplifier. A switch is located in the feedback path for disconnecting said path and allowing said amplifier to operate as a high gain differential amplifier in the compare mode. Thus, said compare amplifier is utilized both in the balance and compare modes of system operation. In the balance mode, a first signal is passed through said amplifier operating with a low gain and stored by a storage means. In the compare mode, the stored signal is applied to one input of the high gain differential amplifier and a second signal is applied to the other input whereby an output signal is produced whose polarity is indicative of which input signal is greater and whose magnitude is proportional to the extent of their difference. By using the compare amplifier in both modes of operation, D.C. drift errors are compensated, that is, the system is D.C. stabilized. The signal stored by the storage means during the balance period is proportional to the magnitude of the first signal plus D.C. offset errors from any component in the first signal path and amplifier input errors. The stored signal including said offset errors is compared to a second signal having offset errors from any component in its signal path and amplifier input errors. Thus, any D.C. offset error common to the stored signal and the second signal is substantially canceled, for example, amplifier input errors. Broadly, D.C. offset errors in any component in the common signal path are compensated, resulting in a D.C. stabilized system.

In accordance with the invention a comparator is provided comprising a high gain differential amplifier having two inputs and an output and having two modes of operation, one mode being low gain operation and the other mode being high gain differential operation, feedback means coupling said output to one of said inputs, said feedback means including switch means for connecting and disconnecting said feedback means, whereby said amplifier operates in said one mode and said other mode respectively, and storage means coupled to said feedback means for storing the amplifier output signal when the amplifier is operating in said one mode and for applying the stored signal to said one of said inputs when said amplifier is operating in said other mode. Therefore, a signal to be compared with a reference signal stored by said storage means during the balance period may be applied to the other of said two inputs of said amplifier.

The invention may be utilized to compare two voltages or currents, either A.C. or D.C., such as a known and an unknown voltage. Furthermore, the invention may be used in conjunction with an analog-to-digital converter for either comparison of an unknown difference signal with a reference or for performing sample, hold and compare functions for the converter.

Accordingly, an object of the invention is an improved system for comparing different signals.

Another object of the invention is a comparator which utilizes a compare amplifier in high and low gain modes of operation.

Another object of the invention is a comparing system which is D.C. stabilized.

Another object of the invention is to provide a system for comparing different signals in which a differential amplifier is utilized in both the balance and compare modes of system operation.

Another object of the invention is to provide a system for comparing different signals and having two modes of operation in which a differential amplifier is operated as a low gain device in one mode of operation and a high gain differential amplifier in another mode of operation.

Another object of the invention is to provide a system for comparing different signals having two modes of operation, balance and compare, whereby a differential amplifier having a negative feedback loop is used as a low gain amplifier in the balance mode and a high gain differential amplifier in the compare mode.

Another object of the invention is a system for comparing different signals having two modes of operation, balance and compare, whereby said system comprises a differential amplifier having a negative feedback loop, a switch for disconnecting said feedback loop, and a storage means coupled to said feedback loop.

Another object of the invention is to provide a comparator comprising a high gain differential amplifier having a disconnectable negative feedback path and storage means coupled to said feedback path for storing an amplifier output signal when said feedback path is connected and applying the stored signal to the amplifier input when said feedback path is disconnected.

A further object of the invention is to provide a comparator utilizing a high gain differential amplifier in two modes of operation, balance and compare, and said amplifier comprises a plurality of transistors operating in their non-saturated state whereby the overall amplifier response has upper and lower saturation limits.

The foregoing and other objects, features and advantages of the invention will be apparent to one skilled in the art from the following detailed description taken in connection with the appended claims and attached drawings in which:

Figure 1:
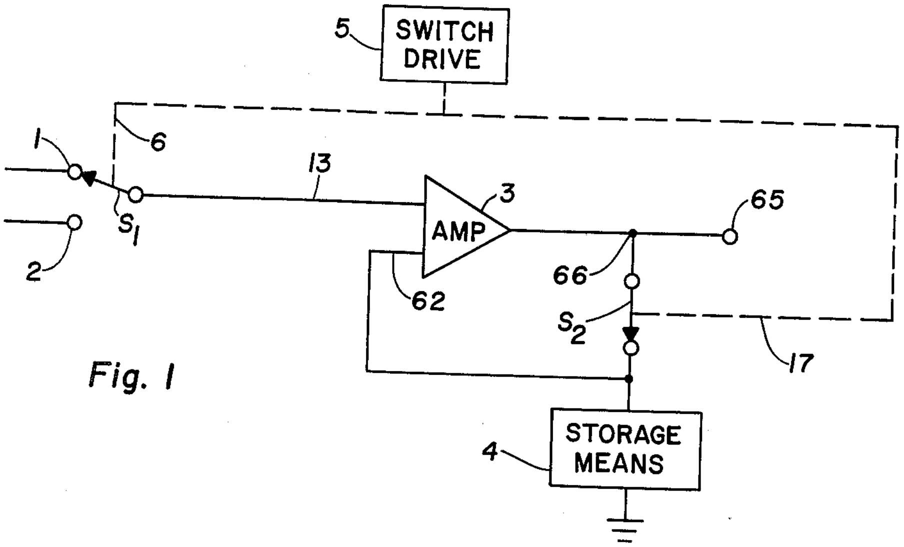
FIG. 1 is a system embodiment of the invention showing switch means and switch drive means.

Referring to FIG. 1, the switches $S_1$ and $S_2$ are shown positioned in the balance mode. Therefore, the negative feedback path from terminal 66 to input 62 for amplifier 3 is connected by switch $S_2$ and the input 13 for amplifier 3 is connected to terminal 1 by switch $S_1$. Amplifier 3 is a high gain differential amplifier having two inputs 13 and 62 and an output 66. A signal applied to terminal 1 is applied to input 13 by switch $S_1$. Amplifier 3 is forced to operate as a low gain amplifier since the negative feedback path is closed, thereby passing the signal applied to input 13 to its output at 66. The output signal at terminal 66 is fed back to the input at 62 to balance said amplifier and produce a balanced output at terminal 66 whereby the feedback signal is stored by storage means 4. Therefore, the signal applied to terminal 1 during the balance period (the interval that switch $S_1$ is connected to terminal 1) is stored by storage means 4. At the end of the balance period the output signal at 66 is a minimum since the stored voltage at 62 is nearly equal to the input voltage at 13 plus amplifier 3 offset errors. In the compare mode, switch $S_1$ connected to terminal 2 and switch $S_2$ open, the signal applied to terminal 2 is applied to input 13 by switch $S_1$ and compared with the stored signal at input 62.

The switches $S_1$ and $S_2$ may be transistor circuits activated or deactivated by a command pulse from switch drive 5. Therefore, switch drive 5 may be a pulse generator applying a pulse to two transistor circuits, $S_1$ and $S_2$, for rendering said circuits conductive, connecting terminal 1 and input 13 and terminal 66 and input 62 and rendering said circuit non-conductive between terminal 2 and input 13 in the balance mode. Upon the absence of a pulse from switch drive 5, the transistor circuit between terminal 2 and input 13 would become conductive and the transistor circuits between terminal 1 and input 13 non-conductive and between 66 and input 62 non-conductive. Transistor switches activated or deactivated in response to the presence or absence of a pulse are within the scope of one skilled in the art and need not be further explained.

Figure 2:
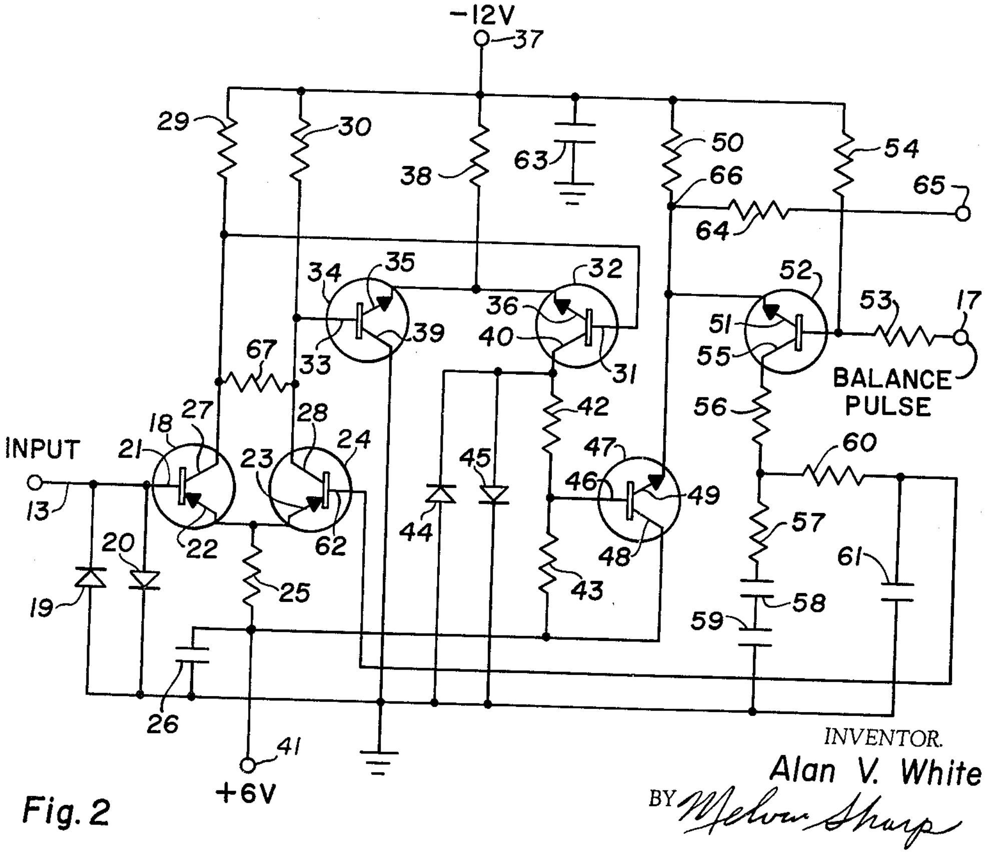
FIG. 2 is a detailed schematic of an embodiment of the invention.

Referring now to FIG. 2, there is shown a high gain differential amplifier, transistors 18, 24, 32, 34, 47 and associated biasing circuitry, which may comprise the amplifier generally illustrated as 3 in FIG. 1. Also, FIG. 2 shows the switch $S_2$ as transistor 52, and the storage means 4 as capacitors 58 and 59. A balance pulse from switch drive 5, for example a plus 6 volt, 32 microseconds wide pulse, may be applied to terminal 17 for forward biasing transistor 52 and rendering it conductive, applying the voltage at terminal 66 to the storage capacitors 58 and 59 through resistors 56 and 57 for the duration of said pulse. This corresponds to the balance mode of operation previously described in conjunction with FIG. 1.

Input terminal 13 is coupled to the base electrode 21 of the transistor 18. A pair of oppositely poled diodes 19 and 20 are connected in parallel between the base electrode 21 and ground. The emitter electrode 22 of transistor 18 is coupled to the emitter electrode 23 of the transistor 24. The emitter electrodes 22 and 23 are coupled to a positive source of relatively constant current 41 through a resistor 25. The source of current is coupled to ground through a capacitor 26 for A.C. coupling to ground. The collector electrode 27 of the transistor 18 is coupled to a source of negative voltage through a resistor 29 while the collector electrode 28 of the transistor 24 is coupled to the same source of negative voltage through a resistor 30.

The collector electrode 27 of the transistor 18 is coupled to the base electrode 31 of the transistor 32. The collector electrode 28 of the transistor 24 is coupled to the base electrode 33 of the transistor 34. The emitter electrode 35 of the transistor 34 and the emitter electrode 36 of the transistor 32 are each coupled to the negative source of voltage 37 through a common resistor 38. The collector electrode 39 of the transistor 34 is coupled to ground. The collector electrode 40 of the transistor 32 is coupled to the source of positive voltage 41 through a pair of series connected resistors 42 and 43. The collector 40 is also coupled to ground through the parallel combination of oppositely poled diodes 44 and 45. The junction of the resistors 42 and 43 is coupled to the base electrode 46 of the transistor 47. The collector electrode 48 of the transistor 47 is coupled to the positive source of voltage 41. The emitter electrode 49 of the transistor 47 is coupled to the negative source of voltage 37 through a resistor 50 and is also coupled to the emitter electrode 51 of a transistor 52. The base electrode of the transistor 52 is coupled through a resistor 53 to the balance pulse terminal 17 and also through a resistor 54 to the negative source of voltage 37. The collector electrode 55 of the transistor 52 is coupled to series connected resistors 56 and 57. Series connected capacitors 58 and 59 are connected between resistor 57 and ground. The capacitors 58 and 59 are of sufficient magnitude to store a balancing voltage for over a one millisecond period, and their high frequency characteristics also allow accurate balance with no instability or oscillation during the balancing period.

The junction of the resistors 56 and 57 is coupled to ground through a resistor 60 and capacitor 61 to provide a high frequency bypass to ground. The junction of the resistor 60 and the capacitor 61 is coupled to the base electrode 62 of the transistor 24. A capacitor 63 is coupled between the source of negative voltage 37 and ground for A.C. coupling to ground. The output of the system is taken from the emitter electrode 49 through the resistor 64 and the output terminal 65.

It should be noted that emitter-follower transistor 47 may be eliminated and the junction between resistors 42 and 43 connected directly to the emitter 51 of transistor 52. Transistor 47 merely provides impedance matching and may be eliminated when the matching is adequate without said transistor.

Also, an emitter-follower transistor amplifier may be included between the junction of resistor 60 and capacitor 61 and the input 62 of transistor 24 for impedance matching and isolation purposes. Similarly, an emitter-follower transistor amplifier may be included between input terminal 13 and base 21 of transistor 18.

The high gain differential amplifier, transistors 18, 24, 32, 34 and associated biasing circuitry, operates as follows:

The amplifier comprises a plurality of transistor stages each operating in their non-saturated state whereas the overall amplifier response is saturated in two voltage limits, positive and negative maximum. Each transistor 18, 24, 32 and 34 is maintained in its non-saturated state by properly choosing its voltage and current ranges whereby collector current does not exceed a predetermined value and the collector voltage does not decrease below a predetermined value. This is accomplished by diode pairs 19–20 and 44–45 limiting the positive to negative voltage range at base 21 and collector 40, respectively. Resistor 25 and the +6v. source at 41 maintain a relatively constant current for emitters 22 and 23. Resistors 29, 30 and 67 have a sufficiently low resistance so as to ensure a narrow voltage swing at collectors 27 and 28 and maintain the voltage at collector 28 above a predetermined value. Similarly, the −12v. source and resistor 38 provide a relatively constant current for emitters 35 and 36. Thus the transistors are operated and maintained in their non-saturated state which is their most efficient mode of operation.

Transistor pairs 18–24 and 32–34 are differentially arranged whereby the collector currents of transistors 24 and 34 increase when the collector currents of transistors 18 and 32 decrease and vice versa. In the balance period, transistor 52 conducting, and a reference signal such as ground applied to input 13, the collector current of transistor 18 increases or decreases depending on the potential applied to input 62 by storage means 58 and 59. Thus the difference in potentials at bases 21 and 62 is amplified and produces a voltage drop across resistor 67. If the potential at base 21 is more positive than that at base 62, less collector current flows in the collector circuit of transistor 18 and the potential at base 33 is more positive than that at base 31. Therefore, less current is drawn through resitsors 42 and 43 resulting in a more positive potential at base 46. A more positive voltage is thereby applied to terminal 66 which charges capacitors 58 and 59 and drives input 62 more positive until balance, that is, the capacitors charge until the voltage at 62 is nearly equal to the voltage at 21 plus amplifier offset errors. If the voltage at 21 is negative with respect to the voltage at 62, the voltage at 66 becomes more negative charging the capacitors 58 and 59 negatively and driving the input 62 negative.

Theoretically, a single capacitor may be utilized as the storage means; however, the network 56, 57, 58, 59, 60, 61 is utilized as the storage means to provide stability and prevent oscillation.

In the compare mode, transistor 52 is non-conductive, the voltage stored by the storage means being applied to input 62 to be compared with the signal applied to input 13. The output signal at 65 has a magnitude within the voltage range or at the range limits set by diodes 44 and 45 and has a polarity, positive or negative, of the signal applied to terminal 2 (FIG. 1) with respect to the signal applied to terminal 1 (FIG. 1) during the balance period.

The comparator shown in FIG. 2 having transistors operating in their non-saturated state and having a positive and negative maximum output voltage range offers optimum non-saturated transistor circuit design giving high speed performance.

A typical set of values for the components of FIGURE 2 would be as follows:

| | |
|---|---|
| Resistor 25 | 2K ohms. |
| Resistor 29 | 3.9K ohms. |
| Resistor 30 | 3.9K ohms. |
| Resistor 38 | 1K ohm. |
| Resistor 42 | 82 ohms. |
| Resistor 43 | 1.8K ohms. |
| Resistor 50 | 2K ohms. |
| Resistor 53 | 1K ohm. |
| Resistor 54 | 3.9K ohms. |
| Resistor 56 | 91 ohms. |
| Resistor 57 | 2.7 ohms. |
| Resistor 64 | 100 ohms. |
| Resistor 67 | 3.9K ohms. |
| Capacitor 26 | 330 $\mu$f. |
| Capacitor 58 | 330 $\mu$f. |
| Capacitor 59 | 330 $\mu$f. |
| Capacitor 61 | 0.3 $\mu$f. |
| Capacitor 63 | 150 $\mu$f. |
| Diode 19 | GTD 979. |
| Diode 20 | GTD 979. |
| Diode 44 | IN 659. |
| Diode 45 | IN 659. |
| Transistor 18 | NOO3. |
| Transistor 24 | NOO3. |
| Transistor 32 | NOO4. |
| Transistor 34 | NOO4. |
| Transistor 47 | NOO4. |
| Transistor 52 | NOO4. |

It is to be understood that the above described embodiments are merely illustrative of the application of the principles of the invention. Numerous other arrangements may be devised by those skilled in the art without departing from the spirit and scope of the invention as defined by the appended claims.

What is claimed is:

1. A system comprising means having a predetermined gain characteristic, means for applying an analog signal from a first source to said first mentioned means to produce an output signal, means for storing the output signal, means for changing said predetermined gain characteristic, and means for applying the output signal stored by said storing means and an analog signal from a second source to said first mentioned means.

2. A system for comparing signals comprising amplifying means having two modes of operation, one mode being low gain operation and the other mode being high gain differential operation, means for changing the operation of said amplifying means from said one mode to said other mode, means for applying an analog signal from a first source to said amplifying means when operating in said one mode to produce an output signal, means for storing the output signal, and means for applying an analog signal from a second source and the signal stored by said storing means to said amplifying means when operating in said other mode.

3. A system for comparing signals comprising amplifying means having a feedback loop for low gain operation, means for applying an analog signal from a first source to said amplifying means to produce an output signal, means for storing the output signal, means for disconnecting said feedback loop for high gain operation of said amplifying means, and means for applying an analog signal from a second source and said output signal stored by said storing means to said amplifying means for comparing said analog signals.

4. A system for comparing signals comprising an amplifier having feedback means for operating said amplifier at a low gain, means for sampling an analog signal from a first source and applying the sampled signal to said amplifier to produce an output signal, means for storing the output signal, means for disconnecting said feedback means for operating said amplifier at a high gain, and means for applying an analog signal from a second source and said output signal stored by said storing means to said amplifier.

5. A system for comparing signals comprising a high gain differential amplifier having a plurality of inputs, feedback means coupling the output of said amplifier to one of said plurality of inputs, means for applying an analog signal from a first source to another of said plurality of inputs to produce an output signal, means for storing the output signal, means for disconnecting said feedback means, and means for applying an analog signal from a second source to said another of said plurality of inputs and concurrently applying the signal stored by said storing means to said one of said plurality of inputs.

6. The comparator of claim 5, wherein said differential amplifier means includes a plurality of transistors, and means coupled to said transistors for operating and maintaining said transistors in their non-saturated state.

7. The comparator of claim 6, wherein said last mentioned means includes means for limiting the output voltage range of said differential amplifier means.

8. The comparator of claim 5, wherein said differential amplifier means includes a plurality of differentially coupled transistors, and biasing means and voltage limiting means coupled to said transistors for operating and maintaining said transistors in their non-saturated state and limiting the output voltage range of said differential amplifier means.

9. A system for comparing signals comprising a high gain differential amplifier having two inputs and an output, feedback means coupling said output to one of said inputs, whereby said amplifier operates at a low gain, means for sampling an analog signal from a first source and applying the sampled signal to the other of said inputs, means for storing the signal at said output of said amplifier, means for disconnecting said feedback means whereby said amplifier operates as a high gain differential amplifier, means for applying an analog signal from a second source to said other of said inputs, and means for applying the signal stored by said storing means to said one of said inputs, whereby said amplifier produces an output signal proportional to the difference between the signals coupled to said inputs.

10. A differential amplifier comprising a first pair of differentially coupled transistors each having emitter, base and collector electrodes, means coupling said transistors for differential operation whereby the sum of their collector currents remains substantially constant, first voltage limiting means coupled to the base electrode of one of said first pair of transistors and source means coupled to said emitter and said collector electrodes of said first pair of transistors for operating and maintaining said transistors in their non-saturated state, a second pair of differentially coupled transistors each having emitter, collector and base electrodes, means coupling said second pair of transistors for differential operation whereby the sum of their collector currents remains substantially constant, means coupling said collector electrodes of said first pair of transistors to said base electrodes of said second pair of transistors, and second voltage limiting means coupled to the collector electrode of one of said second pair of transistors and source means coupled to said emitter and collector electrodes of said second pair of transistors for operating and maintaining said second pair of transistors in their non-saturated state, whereby the base electrodes of said first pair of transistors comprise the inputs to said differential amplifier and the collector electrode of said one of said second pair of transistors comprises the output.

11. The differential amplifier of claim 10, wherein said first voltage limiting means includes oppositely poled parallel connected diodes coupled to said base electrode of said one of said first pair of transistors and ground.

12. The differential amplifier of claim 11, wherein said second voltage limiting means includes oppositely poled parallel connected diodes coupled to said collector electrode of said one of said second pair of transistors and ground.

References Cited by the Examiner

UNITED STATES PATENTS

| | | | |
|---|---|---|---|
| 2,834,883 | 5/1958 | Lukoff | 328—151 |
| 3,050,673 | 8/1962 | Widmer | 307—88.5 X |
| 3,073,971 | 1/1963 | Daigle | 307—88.5 |

DAVID J. GALVIN, *Primary Examiner.*

ARTHUR GAUSS, *Examiner.*